US006945742B2

(12) United States Patent
Roberts

(10) Patent No.: US 6,945,742 B2
(45) Date of Patent: Sep. 20, 2005

(54) PORTABLE MANHOLE COVER REMOVER

(76) Inventor: Dave Roberts, 965 Robinhood Pl., Shoreview, MN (US) 55126-5933

( * ) Notice: Subject to any disclaimer, the term of this patent is extended or adjusted under 35 U.S.C. 154(b) by 0 days.

(21) Appl. No.: 10/177,259

(22) Filed: Jun. 20, 2002

(65) Prior Publication Data

US 2003/0235487 A1 Dec. 25, 2003

(51) Int. Cl.⁷ .............................................. B66C 23/18
(52) U.S. Cl. ..................... 414/449; 414/490; 414/684.3; 212/166
(58) Field of Search ................................ 414/444, 449, 414/457, 490, 684.3; 212/166; 254/4 R, 4 C, 323

(56) References Cited

U.S. PATENT DOCUMENTS

| 1,887,965 A | * | 11/1932 | Stoner .......................... 254/323 |
| 2,804,979 A | | 9/1957 | Lassiter ........................ 212/59 |
| 3,152,708 A | | 10/1964 | Agesin ........................ 214/375 |
| 3,704,799 A | * | 12/1972 | Morris, Jr. ................... 414/444 |
| 3,885,688 A | * | 5/1975 | Larsen ......................... 414/457 |
| 3,926,316 A | * | 12/1975 | Luttrell ........................ 212/259 |
| 4,365,925 A | | 12/1982 | Girtz ........................ 414/684.3 |
| 4,662,607 A | | 5/1987 | Mochizuki et al. .......... 254/131 |
| 4,789,072 A | | 12/1988 | Quam et al. ................. 212/166 |
| 4,826,388 A | | 5/1989 | Golding .................... 414/684.3 |
| 5,035,336 A | | 7/1991 | Schmitz et al. .............. 212/166 |
| 5,090,724 A | * | 2/1992 | Fiore ........................... 280/643 |
| 5,211,526 A | * | 5/1993 | Robinette .................... 414/550 |
| 5,292,107 A | | 3/1994 | Chick .......................... 254/131 |
| 5,328,066 A | * | 7/1994 | Cappuccio et al. .......... 224/506 |
| 5,522,530 A | * | 6/1996 | Boettcher .................... 224/488 |
| 5,975,826 A | * | 11/1999 | Scholder ...................... 414/444 |
| 6,164,898 A | | 12/2000 | Taylor ......................... 414/540 |
| 6,481,694 B2 | * | 11/2002 | Kozak ......................... 254/325 |

FOREIGN PATENT DOCUMENTS

| DE | 3726812 | * | 2/1989 |
| FR | 2610613 | * | 8/1988 |

* cited by examiner

Primary Examiner—James W. Keenan
(74) Attorney, Agent, or Firm—Angenehm Law Firm; N Paul Friederichs

(57) ABSTRACT

A manhole cover remover, including an attachment; a support; a pivot arm having a proximal end hinged to the support and the pivot arm having a distal end; a connector joining the attachment to the distal end of the pivot arm; a winch joined to the distal end of the pivot arm; and a power source, the power source in operable communication with the winch and method of use including the steps of rotating a pivot arm down toward a manhole over; connecting the pivot arm to the manhole cover; and winching the pivot arm upward.

15 Claims, 3 Drawing Sheets

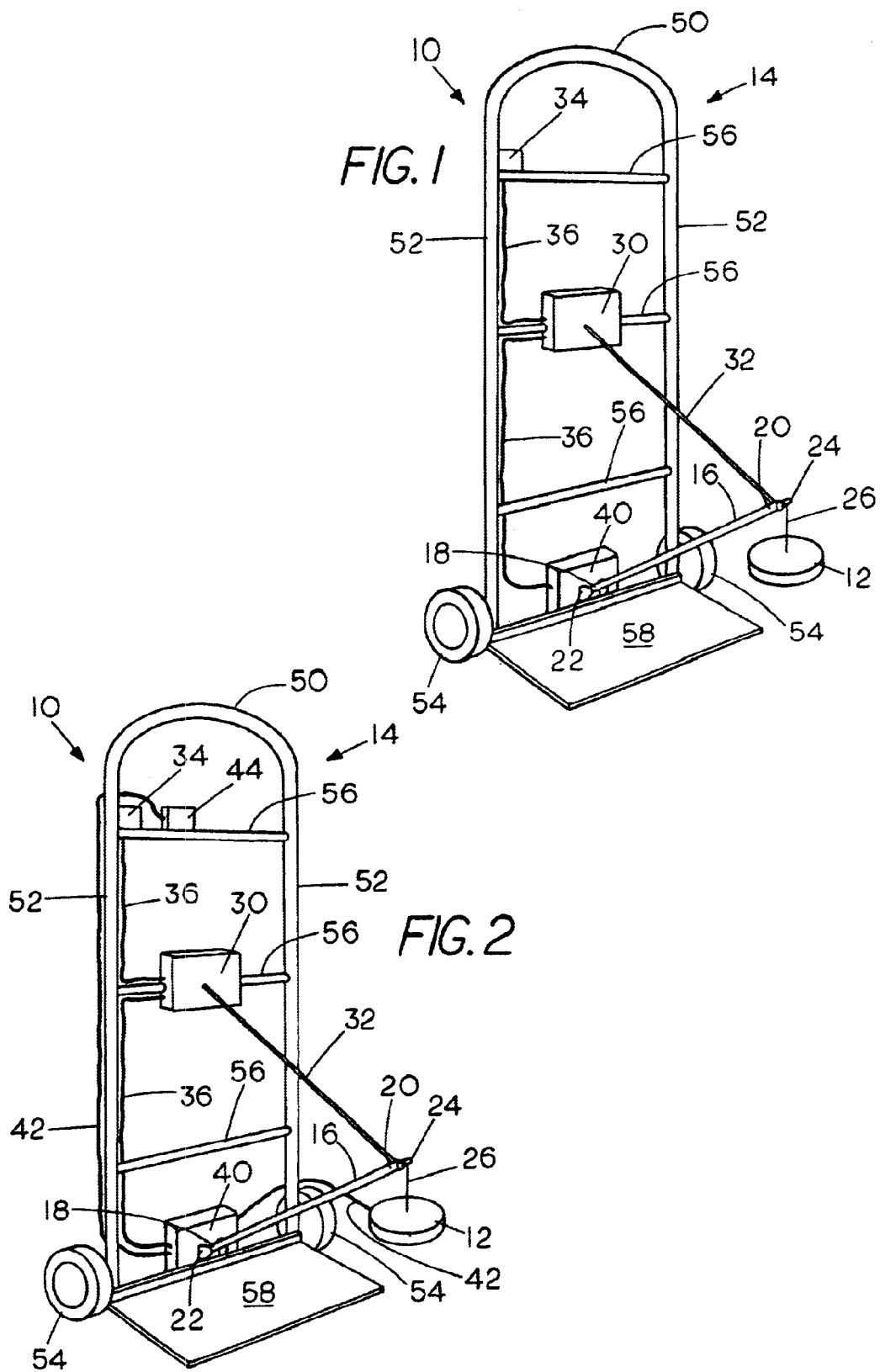

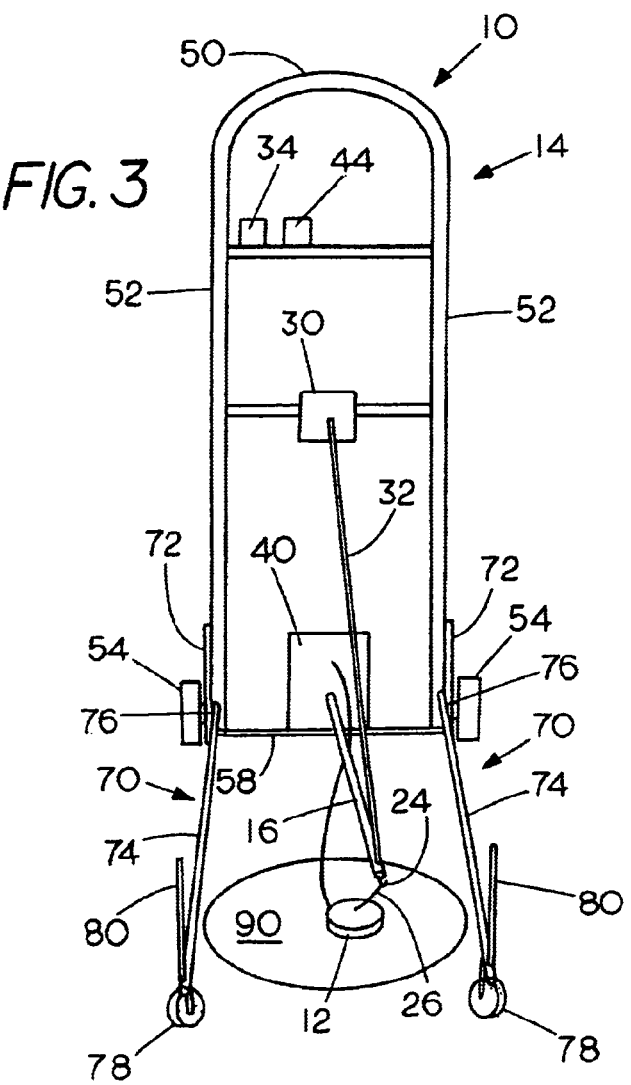
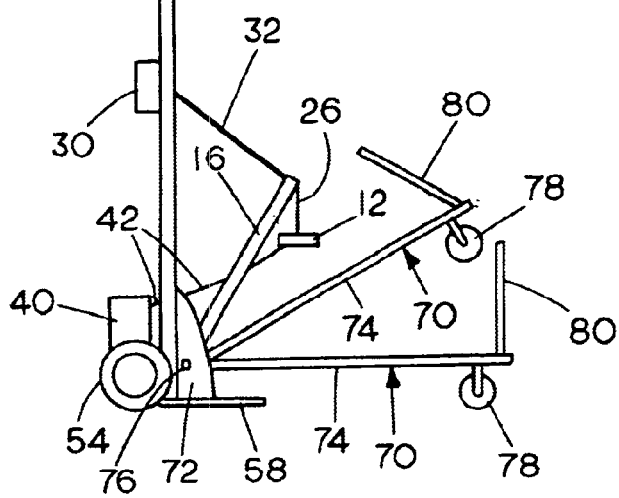

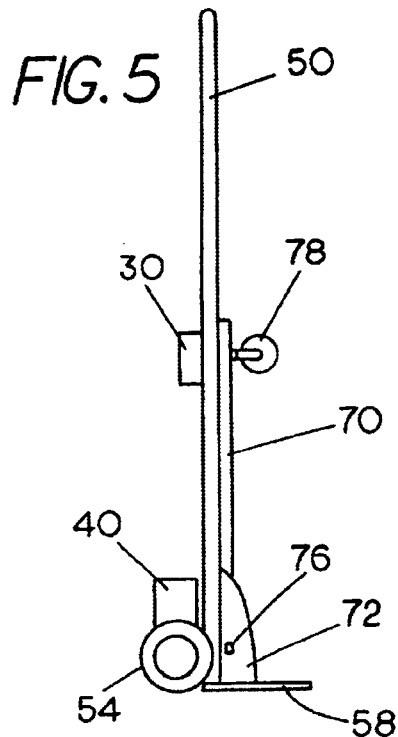
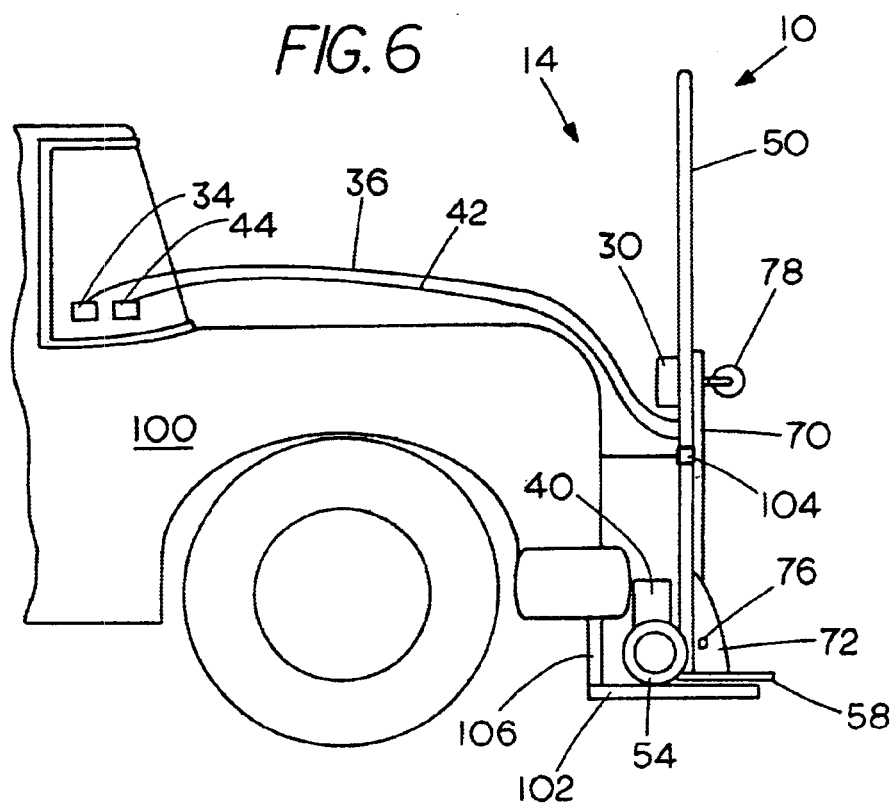

PORTABLE MANHOLE COVER REMOVER

The present invention is in the field of lifters and more specifically devices for lifting and removing manhole covers.

BACKGROUND

Manhole covers are well known access points for various utilities equipment. The covers allow cars and other vehicles to traverse the road without falling into the hole itself. Yet, the covers, approximately fifty pounds each, can be removed for required maintenance. Manhole covers, found along many paved roadways, tend to be spaced between one hundred and five hundred feet apart.

The covers are generally entrenched with rock, tar, sand and dirt. A worker must hook the cover with a pry bar or other equipment and lift. While one cover is a substantial task, removing multiple covers is daunting. Various tools have been developed to ease this task.

For instance, Schmitz et al. (U.S. Pat. No. 5,035,336) and Quarr et al. (U.S. Pat. No. 4,789,072) disclose a Compact Compressible Manhole Cover Lifter and a Hydraulic Manhole Cover Lifter respectively. The lifter is generally an inverted U-shaped piece of equipment that can engage a cover mechanically or magnetically, using either a hydraulic system or winch to lift the cover.

Taylor (U.S. Pat. No. 6,164,898) teaches a Manhole cover Removal Apparatus and Method. A reciprocating member mounted on a vehicle lowers to grasps a cover ad raises to lift the cover.

Agesen (U.S. Pat. No. 3,152,708) discloses a Tool for Lifting Manhole Covers. A lever with wheels, mounted as a fulcrum, applies pressure to a chain joined to the cover.

Mochizuki et al. (U.S. Pat. No. 4,662,607) discloses yet another device for removing manhole covers, entitled Apparatus for Operating Manhole Cover. This device, similar to Agesen, essentially has a lever with wheels, mounted as a fulcrum, which applies pressure to a hanging hook mechanism joined to the cover.

Golding (U.S. Pat. No. 4,826,388) teaches a Manhole Cover Lifter. A key is located in the manhole keyhole and a lever provides the mechanical advantage for lifting the manhole cover.

Chick (U.S. Pat. No. 5,292,107) teaches a Sewer Cover Lifting Tool. This essentially wheeled hand lever tool lifts covers from the side.

Each of the devices are complex, cumbersome and unstable. One device, Lassiter, which is a little less cumbersome than the aforementioned devices is not taught to be used with manhole covers. Lassiter (U.S. Pat. No. 2,804,979) teaches a Portable Lifting Apparatus. A wheeled truck with spaced side frame members carry a boom that may be moved along an arcuate path.

What is needed is a manhole cover remover that is compact for transport and stable in operation. The remover should provide god mechanical advantage and ease of moving, preferably with handles positioned in an easy to reach location. Desirably, it should attach and detach from a vehicle and be usable whether or not it is attached to a vehicle.

SUMMARY OF THE INVENTION

The manhole cover remover is provided with an attachment; a support; a pivot arm, the pivot arm having a proximal end hinged to the support and the pivot arm having a distal end; a winch joined to the distal end of the pivot arm; and a power source in operable communication with the wench.

A method of removing a manhole cover includes the steps of rotating a pivot arm down toward a manhole cover, connecting the pivot arm to the manhole cover and winching the pivot arm upward.

Advantageously, the manhole cover remover has outriggers positionable for support when in use, which pivot upwardly providing a smaller footprint for the remover when not in use.

Also an advantage, the manhole cover remover may be in combination with a dolly providing a mechanism to easily transport the remover between covers.

As yet another advantage, the manhole cover remover may be selectively joined to a vehicle, powered by the vehicles accessory battery or its own battery, and the remover may be separated from the vehicle for use independent thereof.

A further advantage is that handles may be extended for ease of reach to move the manhole cover remover and collapsed for compact storage.

These and other advantages will become clear from reading the description of the invention below.

DESCRIPTION OF THE FIGURES

FIG. 1 is a perspective view showing an embodiment of the present invention joined to a dolly;

FIG. 2 is a perspective view showing a second embodiment of the present invention joined to a dolly;

FIG. 3 is a front view showing the second embodiment of the present invention joined to a dolly with outriggers;

FIG. 4 is a side view of the showing the second embodiment of the present invention with outriggers extended, one handle operably positioned and the another handle being moved to operable position;

FIG. 5 is a side view showing the present invention joined to a dolly in a collapsed position; and FIG. 6 is a side view showing the present invention with a dolly joined to a vehicle.

DETAILED DESCRIPTION

A manhole cover remover 10 is provided with an attachment 12; a support 14; a pivot arm 16 joined to the support 26; a connector 26 joining the attachment 12 to the pivot arm 16; a winch 30 joined to the pivot arm 16; and a power source 40 in operable communication with the winch 30.

The attachment 12 may be any device suitable for attachment to a manhole cover 90 such as hooks, clamps or magnets. Preferably, the attachment 12 is a magnet. Most preferably, as shown in the second embodiment, the attachment 12 is an electromagnet. The attachment 12 is joined to the pivot arm 16.

The support 14 may be any structure suitable for supporting the pivot arm 16. In one embodiment; the support 14 is a dolly 50, such as a two-wheeled dolly 50. The dolly 50 includes uprights 52, wheels 54, cross bars 56 and a base plate 58. The wheels 54 and cross bars 56 are joined to the uprights 52 with the base plate 58 extending perpendicularly from the uprights 52. Alternatively, the support 14 may be a vehicle 100.

The vehicle 100 may be joined to the pivot arm 16 and attachment 12. The wench winch 30, joined to the pivot arm 16, may raise and lower the attachment 12 relative to the manhole cover 90. A power source 40, which may be the accessory battery of the vehicle 100, is in operable communication with the winch 30. In such a configuration the dolly 50 is replaced by the vehicle 100 itself.

In a more preferred configuration, the vehicle 100 includes a lower mount 102 that may be raised an lowered hydraulically or by other mechanism. The vehicle 100 further includes selectively removable clamps 104 that attach to the uprights 52 of the dolly 50. When joined, the dolly 50 sits on top of the lower mount 102 and is held in place by the clamps 104. Wiring 36 and 42 may allow the controls 34 and 44 for the winch 30 and power source 40 respectively to be operated from inside the vehicle 100.

The pivot arm 16, joined to the support 14 may be any extender suitable for positioning the attachment 12 toward the manhole cover 90. Desirably the pivot arm 16 is relocatable to a stored position, which is desired to be vertical near the uprights 52. The pivot arm 16 has a proximal end 18, which may be joined with a hinge 22 to the support 14. The distal end 20 or the pivot arm 16 may further have a hook or eyelet 24 for connection to the connector 26 and cable 32.

The connector 26 may be any device suitable for joining the attachment 12 to the pivot arm 16. Desirably, the connector 26 is joined to the distal end 20 of the pivot arm 16, perhaps to the hook or eyelet 24. Suitable connectors 26 include cables, chains and may be the cable 32 of the winch 30 described further below.

The winch 30 may be joined to the distal end 20 of the pivot arm 16 via cable 32. Preferably, the winch 30 includes a control 44 and wiring 36. Wiring 36 may join the control to the remainder of the winch 30 and may further connect the winch 30 to the power source 40. The winch 30 should be of suitable size and strength to lift a manhole cover 90 from a street surface. Cross bars 56 of the dolly 50 may provide a suitable mounting structure for the winch 30.

The power source 40 may be in operable communication with the magnet 12 and may be in operable communication with the winch 30. The preferred power source 40 is a 12-volt battery, such as those commonly used as accessory batteries in vehicles. The power source 40 provides the power to operate the winch 30 and allows use of an electromagnet as the attachment 12.

One or more outriggers 70 may be used to stabilize the support 14, during removal of the cover 90. The preferred outrigger 70 includes a horizontal arm 74 rotatably joined to an attachment plate 72. Rotation of the outriggers 70 to a vertical position provides a small footprint of the remover 10 for easy transport. The attachment plate 72 may be used to secure the outriggers 70 to the uprights 52 of the dolly 50. The attachment plates 72 desirably include securements 76, preferably detents, which engage the horizontal arms 74, selectively locking the horizontal arms 74 in a horizontal position and in a vertical position. Castors 78 may be joined to the horizontal arms 74 as shown to allow for easy movement of the remover 10 about a manhole cover 90. The outriggers 70 are preferably angles sufficiently to allow the castors 78 and wheels 54 of the dolly 50 to be positioned across the manhole cover 90 from each other.

Handles 80 may be joined to the horizontal arms 74 such that the remover may easy be repositioned regardless of the location of the user. The handles 80 preferably are hinged attached to the horizontal arms 74 such that the handles 80 may be positioned perpendicular to the arms 74 when in use and the handles 80 may be positioned parallel to the arms 74 in a collapsed or storage position. Detents may be used to selectively hold the handles 80 in the use position or the storage position. Telescoping handles 80 are desired to allow for smaller storage and longer handles, providing easy reach, when in use.

In operation, a manhole cover 90 may be removed by the steps of vertically positioning outriggers 70 the a horizontal position; rotating a pivot arm 16 down toward a manhole cover 90; connecting the pivot arm 16 to the manhole cover 90; and winching the pivot arm 16 upward. Moving a support 14, such selectively with a dolly 50 or vehicle 100, may locate the pivot arm 16 relative to the cover 90. The pivot arm 16 may connect to the manhole cover 90 with an electromagnet.

Although the present invention has been described with reference to preferred embodiments, workers skilled in the art will recognize changes may be made in form and detail without departing from the spirit and scope of the invention.

I claim:

1. A manhole cover remover, comprising:

an attachment, the attachment being a magnet;

a support, the support including uprights, wheels, cross bars and a base plate;

at least one outrigger, the at least one outrigger including a horizontal arm, an attachment plate joining the horizontal arm to the support, a castor joined to the horizontal arm and a handle hingedly joined to the horizontal arm, the horizontal arm rotating between a vertical position such that the horizontal arm is positioned longitudinally against the support and a horizontal position such that the wheels of the support and the castor of the horizontal arm are positioned approximately equidistant in a circumferential manner about a manhole cover;

a pivot arm, the pivot arm having a proximal end hinged to the support and the pivot arm having a distal end;

a connector joining the attachment to the distal end of the pivot arm;

a winch joined to the distal end of the pivot arm, the winch including a control and wiring; and a power source, the power source in operable communication with the magnet and the power source in operable communication with the winch.

2. A manhole cover remover, comprising:

an attachment;

a support;

at least one outrigger joined to the support;

a handle joined to the at least one outrigger, the handle having a use position wherein the handle is oriented approximately ninety degrees relative to the at least one outrigger and a collapsed position wherein the handle is oriented generally parallel to the at least one outrigger;

a pivot arm, the pivot arm having a proximal end hinged to the support;

a connector joining the attachment to the distal end of the pivot arm;

a winch joined to the distal end of the pivot arm; and a power source, the power source in operable communication with the winch.

3. The device of claim 2 wherein the attachment is a magnet.

4. The device of claim 3 wherein the power source is in operable communication with the magnet.

5. The device of claim 2 wherein the support further includes:

uprights;

wheels connected to the uprights; and a base plate joined to the uprights.

6. The device of claim 5 wherein the support is a two-wheeled dolly.

7. The device of claim 6 wherein the two-wheeled dolly is selectively and operably mounted to a vehicle.

8. The device of claim 2 wherein the support is a vehicle.

9. The device of claim 2 further including:

a plurality of outriggers joined to the support.

10. The device of claim 9 wherein each of the plurality of outriggers includes:

a horizontal arm; and an attachment plate, the attachment plate joining the horizontal arm to the support.

11. The device of claim 10 wherein the horizontal arm is at least partially rotatably attached to the support in a vertical direction.

12. The device of claim 2 wherein the at least one outrigger is joined to castors.

13. The device of claim 2 wherein the handle comprises telescoping handles.

14. The device of claim 2 wherein the handle is at least partially rotatably attached to the at least one outrigger.

15. The device of claim 2 wherein the winch is operably joined to a control.

* * * * *